United States Patent [19]

Rossner et al.

[11] 4,008,074
[45] Feb. 15, 1977

[54] METHOD FOR MELTING SPONGE IRON

[75] Inventors: Heinrich-Otto Rossner, Essen; Dietrich Radke, Essen-Margaretenhohe; Jürgen Hartwig, Essen-Steele, all of Germany

[73] Assignee: Fried. Krupp Gesellschaft mit beschrankter Haftung, Essen, Germany

[22] Filed: Jan. 14, 1975

[21] Appl. No.: 540,958

[30] Foreign Application Priority Data

Jan. 14, 1974 Germany .......................... 2401540

[52] U.S. Cl. ....................................... 75/43; 75/38; 75/46
[51] Int. Cl.² ......................................... C21B 11/00
[58] Field of Search ............... 75/38, 40, 43, 44 R, 75/44 S, 46

[56] References Cited

UNITED STATES PATENTS

| | | | |
|---|---|---|---|
| 2,612,444 | 9/1952 | Rummel | 75/40 |
| 2,750,277 | 6/1956 | Marshall | 75/38 |
| 3,454,395 | 7/1969 | Von Stroh et al. | 75/40 |

*Primary Examiner*—M. J. Andrews
*Attorney, Agent, or Firm*—Spencer & Kaye

[57] ABSTRACT

A method for melting sponge iron is provided in which pieces or pellets of sponge iron, which may be partly replaced by scrap, are placed on the surface of a molten metal bath. Oxygen is added to the metal bath at a position below the surface of the bath. Further substances required for the melting process are added to the metal bath under pressure at a position below the surface of the bath. The further substances that are added include solid carbonaceous dust and fine-grained sponge iron.

17 Claims, 1 Drawing Figure

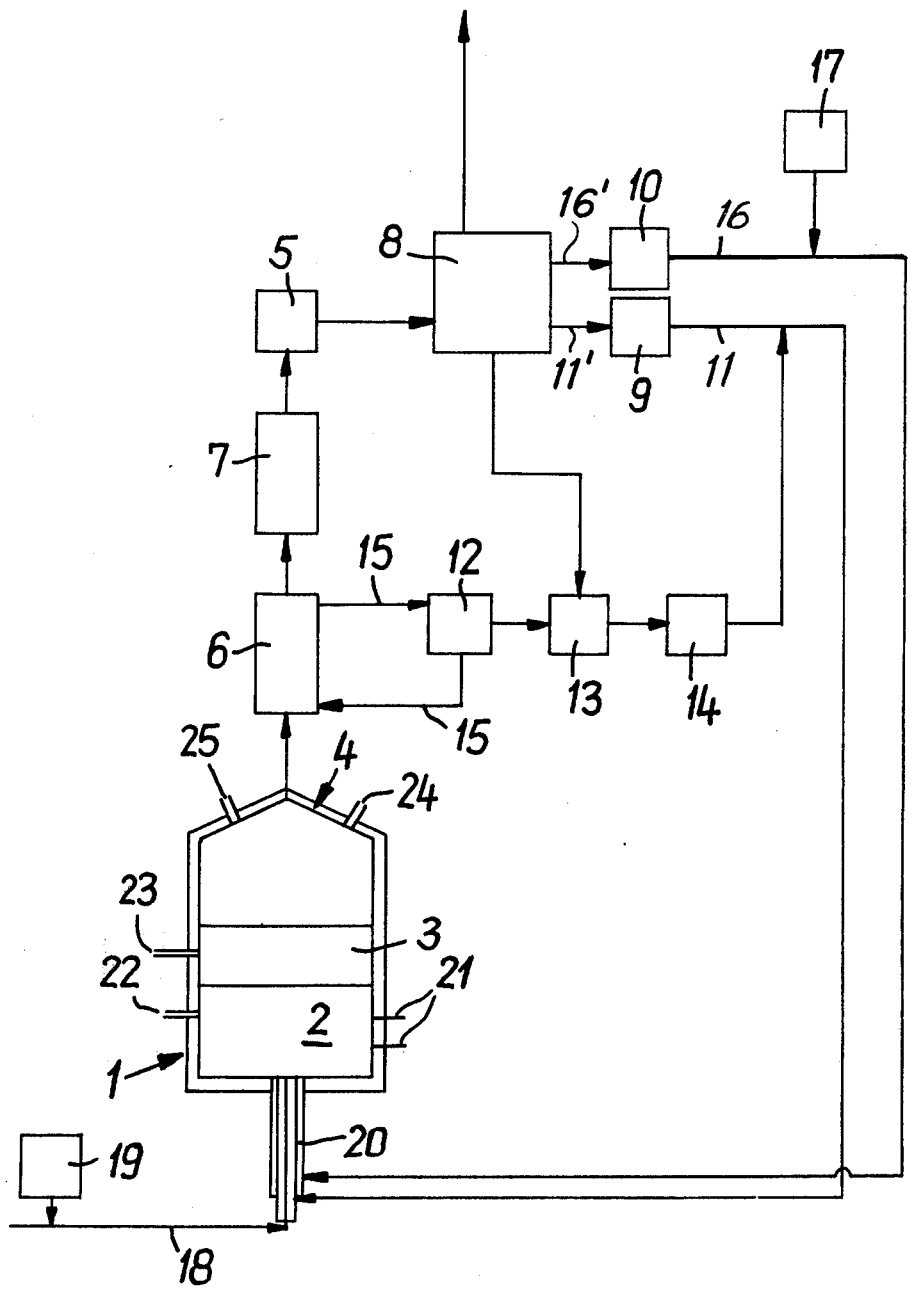

METHOD FOR MELTING SPONGE IRON

FIELD OF THE INVENTION

The present invention relates to a method for melting sponge iron.

BACKGROUND OF THE INVENTION

It is known that the refining of pig iron in a converter involves burning carbon which is contained in the pig iron in a quantity up to 4% as well as other oxidizable accompanying elements in the blown-in air or in the blown-in oxygen. The heat produced in this process can be utilized for melting sponge iron. The capacity of the converter for sponge iron to be melted is limited, however, in an undesirable manner by the carbon content and the content of oxidizable accompanying elements in the pig iron in the converter and in the substances to be melted. Moreover, the nozzles with which the oxygen is introduced into the molten pig iron are subject to heavy mechanical, thermal and chemical stresses which lead to malfunctions in the refining and melting process. Many attempts have therefore been made to introduce larger quantities of heat into the converter by suitable measures and to reduce the process-inherent stresses to which the oxygen feed devices are subjected. In one such prior art method, the metal bath in the converter has been heated by an oil heating system operated with oxygen, but this method has not found acceptance because the capacity of the converter for sponge iron to be melted could not be substantially increased in view of economical considerations due to the insufficient heat transfer from the combustion gases to the metal bath. In another prior art method, pieces of calcium carbide have been added to the melt, but this method does not yield a significant increase in the melting capacity, again in view of economical considerations.

It is further known that gaseous and liquid hydrocarbons have been used in refining processes to protect the oxygen nozzles and the bottom of the converter. These hydrocarbons are introduced into the melt through nozzles associated with the oxygen nozzles, then decompose in an endothermic reaction at the temperature of the melting bath and thus effect cooling of the oxygen nozzles and of the converter bottom. The oxygen and the hydrocarbons can be blown in through jacket nozzles. Although the melting capacity of the converter may be increased by the blowing in of hydrocarbons, significant drawbacks result. The gaseous pyrolysis products, especially hydrogen, flow so fast through the melt that a part thereof is still not burnt when they reach the converter exhaust and thus little heat is developed from the added amount of hydrocarbon. Further, part of the hydrogen dissolves in the metal melt and must be removed therefrom by a costly cleaning process by rinsing with suitable gases, for example nitrogen. In addition, the pyrolysis products are extremely explosive if they contain a certain proportion of oxygen and thus endanger the safety of the entire system. For this reason, only small quantities of hydrocarbons can be blown into the converter which, of course, results in a limitation of the melting capacity of the converter.

In the past, it has been generally required to feed the pieces or pellets of sponge iron, which may be replaced in part by scrap, into the converter in charges and to remove the melt discontinuously so that longer start and dead times result for the converter. During discontinuous operation utilization of the exhaust gases is not very economical because large portions of the exhaust gases developing at the beginning and at the end of the melting process must be discarded.

The particular difficulties encountered during melting of sponge iron are generally caused by its poor heat conductivity. For example, in an electric arc furnace, the major proportion of the metallic material may be sponge iron (up to 80%), which produces higher melting costs due to the poor heat conductivity of the sponge iron. The high intensity of movement of the melt in the discontinuous melting process does have a favorable influence during refining with oxygen on the melting capacity for sponge iron, but the meltable quantity of sponge iron is limited to about 30% by the energy users contained in the pig iron. Moreover, because of the poor heat conductivity of the sponge iron, clods of sponge iron which are difficult to melt may develop and lead to difficulties Particularly during the removal of slag.

SUMMARY OF THE INVENTION

It is a primary object of the present invention to provide a process for melting sponge iron which makes it possible to melt large quantities of sponge iron without the poor heat conductivity of the sponge iron having an adverse effect on the melting process.

Additional objects and advantages of the invention will be set forth in part in the description which follows, and in part will be obvious from the description, or may be learned by practice of the invention. The objects and advantages are realized and attained by means of the steps and combination particularly pointed out in the appended claims.

To achieve the foregoing objects and in accordance with its purpose, this invention provides a process for melting sponge iron which, as embodied and broadly described, comprises placing pieces or pellets of sponge iron onto the surface of a molten metal bath contained in a melting vessel; adding oxygen to the metal bath at a position below the surface of the bath; and adding to the metal bath, under pressure and at a position below the surface of the bath, solid carbonaceous dust and fine-grained sponge iron.

The process of the present invention enables large amounts of sponge iron to be melted and permits continuous removal and addition of materials to the bath. The oxygen stream introduced into the metal bath can contain caustic lime and the pieces or pellets sponge iron introduced into the bath can be partly replaced with scrap. The oxygen and the fine-grained sponge iron and carbonaceous dust required for the melting process preferably are introduced into the molten metal bath in immediate proximity to one another. Generally, the oxygen stream is introduced into the metal bath through an opening in a nozzle and the fine-grained sponge iron and carbonaceous dust are introduced into the metal bath through at least one further opening in a nozzle. The oxygen stream can be introduced via a first opening in a nozzle and the fine-grained sponge iron and carbonaceous dust can be introduced via the same nozzle having at least one additional opening. More than one stream of oxygen can be introduced into the melting vessel and for each such stream there is a corresponding stream for introducing carbonaceous dust and fine-grained sponge iron.

In order to be able to introduce the starting materials into the melting vessel through nozzle openings below the surface of the melt, the carbonaceous dust and the fine-grained sponge iron are suspended in a suitable carrier gas. The suspension in the carrier gas of the substances required for the melting process enables molten iron and slag to be removed from the melting vessel and the starting materials of oxygen, lime, carbonaceous dust, carrier gas, pieces or pellets of sponge iron, fine-grained sponge iron, and scrap to be introduced into the melting vessel in a continuous manner.

It is to be understood that both the foregoing general description and the following detailed descriptions are exemplary and explanatory, but are not restrictive of the invention.

BRIEF DESCRIPTION OF THE DRAWING

The accompanying drawing illustrates an example of a preferred embodiment of the invention and together with the description serves to explain the principles of the invention.

The sole FIGURE of the drawing provides a schematic representation of an apparatus that can be used in accordance with the teachings of this invention to practice the process of this invention.

DETAILED DESCRIPTION OF THE INVENTION

In the practice of the present invention, pieces or pellets of sponge iron are added to the surface of a metal bath. The pieces or pellets of sponge iron or fine-grained sponge iron generally have a size ranging from finest e.g. less than $1\mu$ to 25mm and are introduced into the metal bath at a rate from 0 to 100/g/min × ton of the metal bath. The metal bath preferably contains molten pig iron which is being refined in a melting vessel. Alternatively, molten steel with carbon percentages from less than 0.01 C to 5% C can be used as metal bath.

In one embodiment of the invention, a portion of the pieces or pellets of sponge iron is replaced by scrap. Generally, when using scrap along with the pieces or pellets of sponge iron, the amount of scrap used will range from 1 Kg/minute × ton of the metal bath to 60 Kg/minute × ton of the metal bath and will replace from 0% to 100% amount of the pieces or pellets of sponge iron.

A stream of oxygen is introduced into the metal bath in the melting vessel to bring about combustion of carbon and carbonaceous material. The oxygen stream can have suspended in it caustic lime (CaO) in finely divided form (lime dust). The addition of lime is almost always necessary in order to bind the phosphorus, silicon and sulfur impurities in the melt. The fine lime dust generally has a particle size ranging from finest to about 3mm. The oxygen stream in which fine caustic lime may be suspended is introduced into the molten metal bath below the bath surface. The oxygen stream can be introduced in accordance with known oxygen blowing processes in which oxygen is partially blown into the metal bath with an oxygen blowing lance. Generally, the oxygen stream contains pure oxygen as the only gas in the stream and is introduced at a rate of 0.5 $Nm^3$/minute × ton of the metal melt to 6 $Nm^3$/minute × ton of the metal melt.

In accordance with the invention, solid, carbonaceous dust is added to the metal bath below the surface of the bath. The carbonaceous dust is a carbon containing material in a finely divided state and can, for example, be solid carbon particles or can be in the form of coal dust. Preferably, the solid carbonaceous dust is coal dust. In general, all types of pulverized coal, for example, brown coal, hard coal and high-volatile coal can be used in the process as well as pulverized coke. It is also possible to use solid residues from petroleum processing which can be made into dust-like products by the addition of suitable materials, such as for example, alumina. Moreover, it is possible to use fine-grained calcium carbide as the solid carbonaceous dust.

The solid, carbonaceous dust particles are carried to the metal bath by a carrier gas. The solid carbonaceous dust particles should be substantially free of any water adhering to them before they are suspended in the carrier gas and generally any well known technique can be used to insure that the carbonaceous particles are free of water. When the carbonaceous dust particles are prepared from coal, the coal can be thoroughly dried by steam before it is ground into coal dust.

The carbonaceous dust is combusted with oxygen in the melting vessel in an exothermic reaction which supplies heat to the melting vessel and produces an exhaust gas consisting essentially of pure carbon monoxide. The heat generated from this combustion is used to melt the pieces or pellets of sponge iron that are added to the metal bath as well as the fine-grained sponge iron that is added to the metal bath. The solid carbonaceous dust effects final reduction of the sponge iron.

In the process of the present invention, between 0.7 and 1.3 $Nm^3$ of oxygen are used to burn 1 kg of carbon into carbon monoxide. This reaction produces 2469 Kcal, per kg of carbon, of which about 1069 Kcal are removed from the melting vessel by the carbon monoxide exhaust gas and the carrier gas leaving the melting vessel so that 1400 Kcal remain in the melting vessel can be utilized for the melting process. Since the sponge iron that is to be melted in the bath often contains different amounts of iron, it is necessary to vary the quantity of carbonaceous dust accordingly. The amount of carbonaceous dust added to the metal bath can range, for example, from about less than 1% to 60% of the added sponge iron and scrap and can have a size range from less than $1\mu$ to 3 mm.

In accordance with the invention, fine-grained sponge iron is added to the metal bath below the surface of the metal bath. The fine-grained sponge iron generally has a particle size ranging from about less than $1\mu$ to 3 mm and thus is much smaller than the pieces or pellets of sponge iron placed on the surface of the metal bath. The fine-grained sponge iron serves to improve the cooling conditions near the nozzle below the surface of the bath to introduce oxygen. Moreover the addition of small size sponge iron permits the high melting rates up to 60 Kg/minute × ton of the metal melt. The amount of fine-grained sponge iron added to the metal bath generally ranges from 0% to 100% of the added cooling materials as sponge iron or scrap. The weight ratio of fine-grained sponge iron to added carbonaceous dust preferably is adjusted to a value of from 0 to 0.5.

The fine-grained sponge iron and solid, fine-grained carbonaceous dust are introduced into the metal bath by a carrier gas. The carrier gas used to introduce the solid carbonaceous dust and fine-grained sponge iron can be any gas which does not react, or reacts only to a slight degree, with the substances suspended in the carrier gas and which has no negative effect on the completion of the molten metal and the exhaust gases. The carrier gas, for example, can be argon or nitrogen.

In a preferred embodiment of the process of the present invention, carbon monoxide is used as the carrier gas. It is particularly economical for the process to use the exhaust gas of the melting process as the carrier gas. The exhaust gas contains almost nothing but carbon monoxide and can be introduced into circulation without any complicated dust removal processes. In addition to pneumatically transporting the starting materials, the carrier gas acts together with the combustion gases produced in the melting vessel to effect an intensive mixing of the metal bath and thus produces uniform temperature and concentration conditions in the melting vessel.

For the pneumatic conveyance of the carbonaceous dust and of the fine-grained sponge iron, 3 to 25 Nl carrier gas is required per kg of solids. The particle size of the solids in the carrier gas should be at most 1/10 of the narrowest conveying cross section and preferably should be about $20\mu$. The carrier gas and solids therein are transported by gas line and can be introduced into the melting vessel through one or more nozzles. The pressure with which the starting materials are introduced into the melting vessel is adapted to the respective dimensions of the vessel, its fill level and the number of nozzles. The pressure can range, for example, from 3 bar to 40 bar and the number of nozzles can be from 1 to 30.

The starting materials of oxygen, carrier gas, fine-grained sponge iron and carbonaceous dust can be introduced into the melting vessel by a number of techniques. It is often preferable to have the stream of oxygen, in which fine caustic lime may be suspended, enveloped by a stream of carrier gas in which the solid carbonaceous dust is suspended. This type of introduction of materials can be accomplished with a multiple jacket nozzle having an inner pipe for the flow of the oxygen stream and an outer pipe for transporting the stream of carrier gas and carbonaceous dust.

In another advantageous variation of the process for introducing the starting materials, the stream of oxygen, in which fine caustic lime may be suspended, is enveloped by a stream of carrier gas in which solid carbonaceous dust and fine-grained sponge iron are suspended.

Another embodiment of the present invention for introducing the starting materials to the melting vessel comprises having a first carrier gas stream containing the carbonaceous dust particles envelope the stream of copper, and having a second carrier gas stream, in which the fine-grained sponge iron is suspended, envelope the first carrier gas stream. Thus, it becomes possible to very rapidly melt the fine-grained sponge iron and the carrier gas prevents undesirable reoxidation during the transporting of the fine-grained sponge iron to the melting vessel. This advantageous manner of introducing the fine-grained sponge iron and the carbonaceous dust into the melting vessel or converter can be done with the use of a multiple jacket nozzle having three concentrically disposed nozzle tubes.

In another advantageous embodiment of the present invention, the starting materials are passed through a multi-jacket nozzle in such a manner that a stream of carrier gas, which carries along the fine-grained sponge iron, is enveloped by a stream of oxygen which may contain chalk dust and the stream of oxygen, in turn, is enveloped by a stream of carrier gas, in which fine-grained sponge iron dust is suspended. This type of operation is especially useful for melting fine-grained sponge iron or pieces or pellets of sponge iron in which an oxidizing reaction is necessary to remove undesirable accompanying substances, such as, for example, phosphorus.

Since the process of the present invention is continuous and since all starting materials except for the pellets or pieces of sponge iron and scrap are fed in pneumatically, the quantities of carbonaceous dust, of scrap, and of sponge iron pellets or pieces or fine-grained sponge iron can be varied in mutual dependence upon one another in order to regulate the melting bath temperature and the carbon content of the metal bath. If, for example, the oxygen content and the quantity of carbonaceous dust are increased, the input of sponge iron pellets or pieces or fine-grained sponge iron can be increased with the quantity of scrap remaining the same without there occurring a change in the bath temperature.

This control of the quantities of the streams can also be used to set the carbon content in the metal bath so that it is particularly favorable for melting solid metal additives, such as, for example, caustic lime or limestone, or so that certain metallurgical reactions will be enhanced, for example, the removal of sulfur.

The present invention for melting sponge iron provides a number of advantages as compared to the prior art. The use of solid carbonaceous dust, and particularly coal dust, reduces the expenditures for the melting process because hydrocarbons, especially propane and butane, are more expensive than coal. Further, the use of solid carbonaceous dust increases the melting output of the converter and the operational safety of the exhaust gas system.

In addition, the carbon monoxide exhaust gas produced during the melting process is a valuable product which is particularly suited as a carrier gas for transporting the starting materials of fine-grained sponge iron and solid carbonaceous dust and brings about a thorough mixing of the metal bath and serves as a protective gas for the metal bath. The exhaust gas continuously develops during the melting process and consists of 90 to 99% carbon monoxide. The quantity of exhaust gas which is not used as the carrier gas can be used as a raw material for chemical synthesis or as a heating gas. Generally, about 0.3 to 2% of the exhaust gas is used for carrier gas.

Further, the pneumatic introduction of the starting materials enables the melting process to take place continuously and makes it easy to regulate it.

The process of the present invention enables the carbon content of the metal bath to be controlled by regulating the oxygen and carbon quantities which are added to the metal bath. The carbon content can be controlled to be in an optimum range for a particular purpose during the melting of the pieces or pellets of sponge iron or fine-grained sponge iron. For example, the carbon content can be controlled to insure that the dissolution of metallic additives is particularly effective or the removal of sulfur is particularly enhanced.

One embodiment of the present invention is illustrated in the drawing. In a melting vessel 1, lined with fireproof material, a metal melt 2 is disposed on which a layer of slag 3 is floating. The melting vessel 1 is provided with a substantially gas-tight covering hood 4 from which the exhaust gas is extracted via an extraction device 5, such as, a suction blower. The exhaust gas travels from a radiation boiler 6, where steam is being generated, to a dust remover 7 into a reservoir 8. From reservoir 8 come the streams of carrier gas which are required to transport the fine-grained sponge iron and solid carbonaceous dust. In the embodiment shown in the FIGURE, two individual gas streams 11' and 16' are used as carrier gas streams. The rest of the exhaust gas is deviated through a line 26 for further utilization. The individual streams of carrier gas are compressed in compressors 9 and 10 to the required operating pressure and then enter gas lines 11 and 16. To the carrier gas present in gas line 11 is added the solid carbonaceous dust, in this case coal dust, which is taken from a storage bunker 14. The coal dust is prepared by drying coal in a drier 12. The coal is dried with hot steam obtained from radiation boiler 6. The steam is circulated in line 15. The dried coal is then ground in a mill 13 which can, if required, be supplied with a protective gas, such as, a carbon monoxide atmosphere. This mode of operation is especially useful when younger types of coal, such as, soft coal, for example, are being used for supplying the carbonaceous dust. The protective gas required for the grinding process is taken from reservoir tank 8. To the carrier gas present in line 16 is added fine-grained sponge iron from a storage bunker 17.

A gas line 18 is provided for supplying oxygen to melting vessel 1. Lime dust from a storage bunker 19 is added to the oxygen conducted through gas line 18. The addition of lime is almost always necessary in order to bind the phosphorus, silicon and sulfur impurities contained in the melt.

The gas lines 11, 16 and 18 are connected to one or a plurality of multiple jacket nozzles 20. In nozzle 20, the oxygen is conducted through the innermost pipe, the fine-grained sponge iron through the outermost pipe and the solid carbonaceous dust through the pipe therebetween. Other ways of introducing the starting materials also can be used. The jacket nozzles 20 preferably are located at the bottom of melting vessel 1. The number of multi-jacket nozzles can vary with the size and geometric configuration of the melting vessel, and can vary, for example, from 1 to about 30. Measuring devices 21 are attached to the melting vessel 1 and control the individual stream quantities. If, for example, the temperature of melting bath drops, the intake of sponge iron is reduced. The molten iron in melting vessel 1, which may have a carbon contact that meets the requirements for steel, is removed continuously or intermittently at short intervals through outlet 22 of the melting vessel 1. The slag is removed continuously or at short intermittent intervals through outlet 23. The quantity of available slag depends on the iron content of the sponge iron, on the carbon content of the solid carbonaceous dust and on the quantity of lime added. Metering devices 24 and 25 are provided in covering hood 4 through which chunks or pellets of sponge iron, to which scrap may have been added, enter the melting vessel in such a manner that no exhaust gas can escape. Preferably, the melting vessel 1 is designed large enough that it can simultaneously be used as a storage vessel from which a blown metal can be removed which has a basic composition so that it can be converted to a desired steel in a subsequent final refining process according to known metallurgical processes.

It will be understood that the above description of the present invention is susceptible to various modifications, changes and adaptations, and the same are intended to be comprehended within the meaning and range of equivalents of the appended claims.

We claim:

1. A method for melting sponge iron comprising placing pieces or pellets of sponge iron onto the surface of a molten metal bath of iron; adding oxygen to the metal bath contained in a melting vessel at a position below the surface of the bath; and adding to the metal bath under pressure and at a position below the surface of the bath, solid, carbonaceous dust and fine-grained sponge iron, with the oxygen and the carbonaceous dust and fine-grained sponge iron required for the melting process being introduced into the metal bath in immediate proximity to one another.

2. A method as defined in claim 1 wherein the molten metal bath of iron comprises molten steel.

3. A method as defined in claim 1 wherein the carbonaceous dust and the fine-grained sponge iron are suspended in a carrier gas.

4. A method as defined in claim 1 wherein molten iron and slag are removed from the melting vessel and the starting materials of oxygen, solid, carbonaceous dust, carrier gas, pieces or pellets of sponge iron and fine-grained sponge iron are introduced into the melting vessel in a continuous manner.

5. A method as defined in claim 1 wherein the solid carbonaceous dust is coal dust.

6. A method as defined in claim 1 wherein the carrier gas is carbon monoxide.

7. A method as defined in claim 1 wherein the carrier gas is exhaust gas of the melting process.

8. A method as defined in claim 1 wherein 3 to 25 Nl of carrier gas are used per kg of solid carbonaceous dust and per kg of fine-grained sponge iron.

9. A method as defined in claim 1 wherein a stream of oxygen is enveloped by a stream of carrier gas in which solid, carbonaceous dust is suspended.

10. A method as defined in claim 9 wherein the stream of oxygen is enveloped by a stream of carrier gas in which solid, carbonaceous dust and fine-grained sponge iron are suspended.

11. A method as defined in claim 9 wherein the stream of carrier gas which envelopes the stream of oxygen gas and in which the solid carbonaceous dust is suspended is enclosed by a further stream of carrier gas in which the fine-grained sponge iron is suspended.

12. A method as defined in claim 1 wherein a stream of carrier gas containing fine-grained sponge iron is enveloped by a stream of oxygen gas and the stream of oxygen gas is enveloped by a stream of carrier gas in which solid carbonaceous dust is suspended.

13. A method as defined in claim 1 wherein the quantities of solid carbonaceous dust, sponge iron, carrier gas, oxygen and scrap which can be added to the metal bath are varied in dependence on one another in order to regulate the temperature of the melting bath and the carbon content of the metal bath.

14. A method as defined in claim 1 wherein the oxygen contains caustic lime dust.

15. A method as defined in claim 1 wherein scrap is added to the metal bath.

16. A method as defined in claim 1 wherein the oxygen and carrier gas containing the solid carbonaceous dust and fine-grained sponge iron are introduced into the metal bath through a multi-jacket nozzle at the bottom of the melting vessel.

17. A method as defined in claim 1 wherein the molten metal bath of iron comprises pig iron.

* * * * *